US010457289B2

(12) United States Patent
Payne et al.

(10) Patent No.: US 10,457,289 B2
(45) Date of Patent: Oct. 29, 2019

(54) ACCELERATION LEARNING/PREDICTION FROM LEARNED DECELERATION AREA

(71) Applicant: Toyota Motor Engineering & Manufacturing North America, Inc., Erlanger, KY (US)

(72) Inventors: Joshua D. Payne, Ann Arbor, MI (US); Shannon Alicia Wrobel, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 343 days.

(21) Appl. No.: 15/448,072

(22) Filed: Mar. 2, 2017

(65) Prior Publication Data

US 2018/0252178 A1    Sep. 6, 2018

(51) Int. Cl.
| | |
|---|---|
| *B60W 30/188* | (2012.01) |
| *B60W 20/00* | (2016.01) |
| *B60W 30/17* | (2012.01) |
| *B60W 50/00* | (2006.01) |
| *B60W 30/14* | (2006.01) |

(52) U.S. Cl.
CPC .......... *B60W 30/188* (2013.01); *B60W 20/00* (2013.01); *B60W 30/143* (2013.01); *B60W 30/17* (2013.01); *B60W 50/0097* (2013.01); *B60W 2050/0088* (2013.01); *B60W 2050/0089* (2013.01); *B60W 2520/10* (2013.01); *B60W 2540/10* (2013.01); *B60W 2550/402* (2013.01)

(58) Field of Classification Search
CPC .. B60W 20/00; B60W 30/188; B60W 30/143; B60W 30/17; B60W 50/0097
USPC ........................................................... 701/70
See application file for complete search history.

(56) References Cited

U.S. PATENT DOCUMENTS

| | | | |
|---|---|---|---|
| 6,941,216 B2 * | 9/2005 | Isogai ................ | B60K 31/0008 180/167 |
| 8,634,980 B1 | 1/2014 | Urmson et al. | |
| 8,862,342 B2 * | 10/2014 | Oguri ................ | B60W 30/143 701/1 |
| 9,202,378 B2 | 12/2015 | Otake | |
| 9,262,918 B2 | 2/2016 | Otake | |

(Continued)

*Primary Examiner* — Thomas G Black
*Assistant Examiner* — Luke Huynh
(74) *Attorney, Agent, or Firm* — Christopher G. Darrow; Darrow Mustafa PC

(57) ABSTRACT

Vehicle acceleration from a learned deceleration area or stop can be learned and/or predicted. While approaching a learned deceleration stop, deceleration data including a current accelerator off speed can be acquired. It can be determined whether there is an acceleration learning record for the learned deceleration stop. Responsive to determining that there is an acceleration learning record for the learned deceleration area, it can be determined whether the current accelerator off speed meets a qualification rule based on one or more prior accelerator off speeds included in the acceleration learning record for the learned deceleration area. Responsive to determining that the current accelerator off speed meets the qualification rule, an acceleration for the vehicle from the learned deceleration area can be predicted. The predicted acceleration can include a cruising speed that is substantially equal to the current accelerator off speed.

18 Claims, 3 Drawing Sheets

(56) References Cited

U.S. PATENT DOCUMENTS

| | | | |
|---|---|---|---|
| 10,239,529 B2* | 3/2019 | Filev | B60W 30/18 |
| 2010/0305838 A1* | 12/2010 | Yamamura | F02D 41/062 |
| | | | 701/113 |
| 2011/0066350 A1* | 3/2011 | Sonoda | B60W 30/16 |
| | | | 701/96 |
| 2012/0078439 A1 | 3/2012 | Tokumochi et al. | |
| 2015/0266390 A1 | 9/2015 | Shin et al. | |
| 2015/0266473 A1* | 9/2015 | Hayasaka | B60W 30/09 |
| | | | 701/70 |
| 2017/0015328 A1* | 1/2017 | Oguri | B60W 50/0097 |
| 2018/0093650 A1* | 4/2018 | Payne | B60T 8/172 |
| 2018/0118189 A1* | 5/2018 | Payne | B60W 20/12 |

* cited by examiner

US 10,457,289 B2

ACCELERATION LEARNING/PREDICTION FROM LEARNED DECELERATION AREA

FIELD

The subject matter described herein relates in general to vehicles and, more particularly, to the acceleration of vehicles.

BACKGROUND

Some vehicles are configured to educate drivers on how to more efficiently operate the vehicle. For example, some vehicles coach a driver when approaching a repeatedly-occurring stop. In such case, the vehicle advises the driver when to remove his or her foot from the accelerator pedal to allow the vehicle to coast and when to brake. Following such advice can result in improved fuel economy.

SUMMARY

In one respect, the present disclosure is directed to a method of acceleration learning and/or prediction for a vehicle at learned deceleration areas. The method can include, while approaching a learned deceleration area, acquiring deceleration data for the vehicle using one or more sensors. The deceleration data can include a current accelerator off speed. The method can include determining whether there is an acceleration learning record for the learned deceleration area. The acceleration learning record can include one or more prior accelerator off speeds for the learned deceleration area. The method can include, responsive to determining that there is an acceleration learning record for the learned deceleration area, determining whether the current accelerator off speed meets a qualification rule based on the one or more prior accelerator off speeds for the learned deceleration area. The method can further include, responsive to determining that the current accelerator off speed meets the qualification rule based on the one or more prior accelerator off speeds for the learned deceleration area, predicting an acceleration of the vehicle from the learned deceleration area. The predicted acceleration can be from a starting speed at the learned deceleration area to a cruising speed. The cruising speed can be substantially equal to the current accelerator off speed.

In another respect, the present disclosure is directed to a system of acceleration learning and/or prediction for a vehicle at learned deceleration areas. The system can include one or more sensors. The one or more sensors can be configured to acquire deceleration data for the vehicle while approaching a learned deceleration area. The deceleration data can include a current accelerator off speed. The system can include one or more processors operatively connected to the one or more sensors. The one or more processors can be programmed to initiate executable operations. The executable operations can include determining whether there is an acceleration learning record for the learned deceleration area. The acceleration learning record can include one or more prior accelerator off speeds for the learned deceleration area. The executable operations can include, responsive to determining that there is an acceleration learning record for the learned deceleration area, determining whether the current accelerator off speed meets a qualification rule based on the one or more prior accelerator off speeds for the learned deceleration area. The executable operations can include, responsive to determining that the current accelerator off speed meets the qualification rule based on the one or more prior accelerator off speeds for the learned deceleration area, predicting an acceleration of the vehicle from the learned deceleration area. The acceleration can be from a starting speed at the learned deceleration area to a cruising speed. The cruising speed can be substantially equal to the current accelerator off speed.

In yet another respect, the present disclosure is directed to a computer program product for a vehicle. The vehicle can be configured to learn and/or predict acceleration for a vehicle at learned deceleration areas. The computer program product can include a computer readable storage medium having program code embodied therein. The program code can be executable by a processor to perform a method. The method can include determining whether there is an acceleration learning record for the learned deceleration area. The acceleration learning record can include one or more prior accelerator off speeds for the learned deceleration area. The method can include, responsive to determining that there is an acceleration learning record for the learned deceleration area, determining whether an acquired accelerator off speed for the learned deceleration area meets a qualification rule based on the one or more prior accelerator off speeds for the learned deceleration area. The method can include, responsive to determining that the current accelerator off speed meets the qualification rule based on the one or more prior accelerator off speeds for the learned deceleration area, predicting an acceleration of the vehicle from the learned deceleration area. The acceleration can be from a starting speed at the learned deceleration area to a cruising speed. The cruising speed can be substantially equal to the acquired accelerator off speed.

DETAILED DESCRIPTION

Figure 1:
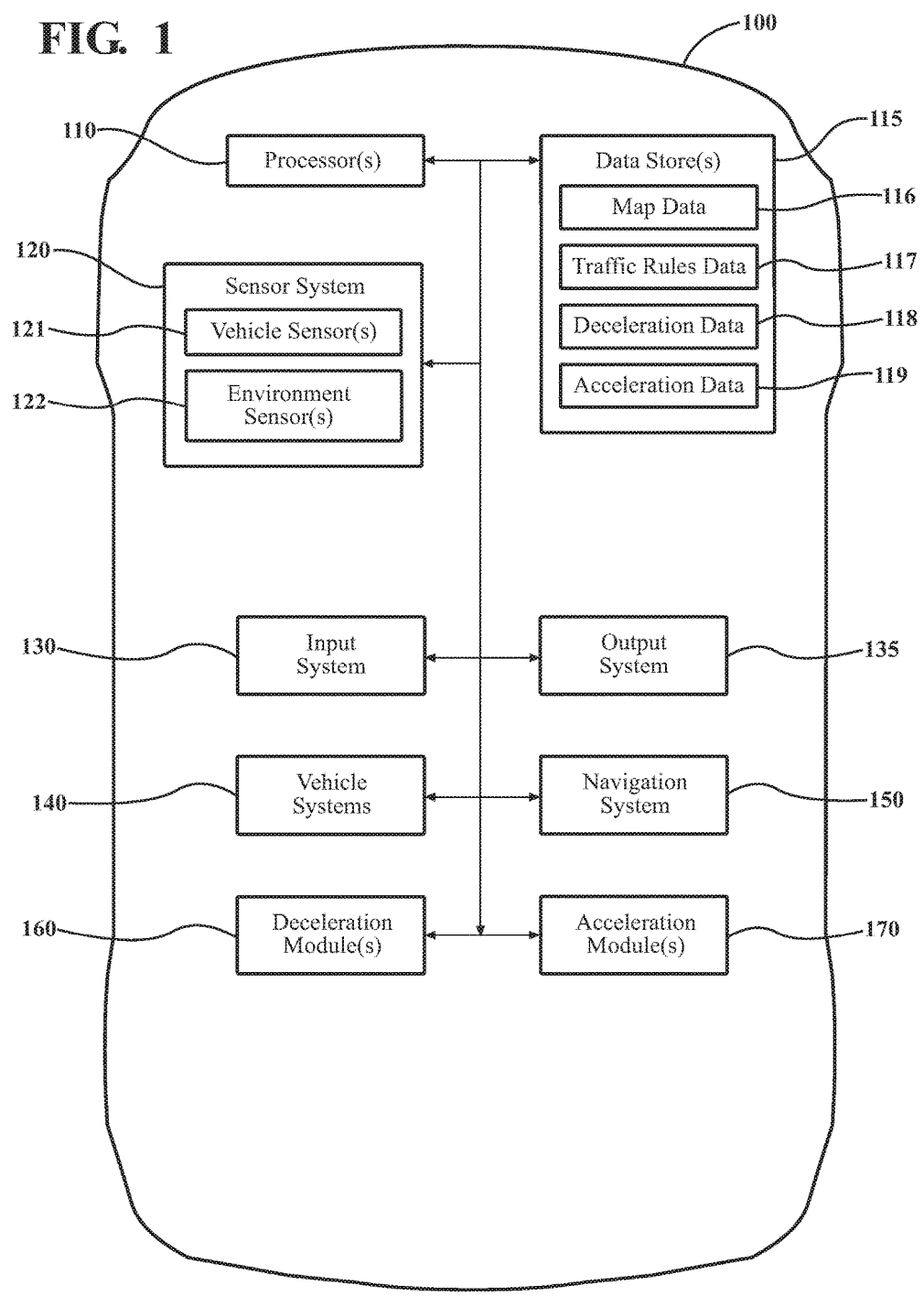
FIG. 1 is an example of a vehicle.

This detailed description relates to the acceleration of a vehicle from a learned deceleration area (e.g., a learned stop). While approaching a learned deceleration area, deceleration data including a current accelerator off speed can be acquired. If there is an acceleration learning record for the learned deceleration area, it can be determined whether the current accelerator off speed meets a qualification rule based on one or more prior accelerator off speeds included in the acceleration learning record for the learned deceleration area. Responsive to determining that the current accelerator off speed meets the qualification rule, an acceleration for the vehicle from the learned deceleration area can be predicted. The predicted acceleration can include a cruising speed that is substantially equal to the current accelerator off speed. The present detailed description relates to systems, methods and computer program products that incorporate such features. In at least some instances, such systems, methods and computer program products can enhance the vehicle performance in fuel economy, efficiency, response, and/or safety management.

As used herein, "deceleration area" means any area in which a vehicle decelerates or comes to a stop. A deceleration area can occur based on traffic regulating devices (e.g., stop lights, stop signs, yield signs, road markings signs, traffic lights, traffic signs, school zones, etc.), laws, rules, regulations, ordinances, etc. Alternatively or in addition, a deceleration area can be based on prevailing conditions (e.g., traffic congestion, construction, etc.). Thus, a deceleration areas can be known in advance, or it can occur in real-time. A "learned deceleration area" is an area in which a vehicle has repeatedly exhibited a similar deceleration pattern in substantially the same area. More particularly, a "learned deceleration area" can be an area in which a vehicle has repeatedly exhibited a similar deceleration pattern in substantially the same area for at least a threshold number of times, a minimum number of times, and/or a statistically significant number of times.

One example of a deceleration area is a stop. As used herein, the term "stop" is an area in which a moving vehicle comes to a stop. The stop may occur based on traffic regulating devices, laws, rules, regulations, ordinances, and/or prevailing conditions. A "learned stop" is an area in which a vehicle has repeatedly exhibited a similar deceleration pattern to come to a stop in substantially the same area. More particularly, a "learned stop" can be an area in which a vehicle has repeatedly exhibited a similar deceleration pattern to come to a stop in substantially the same area for at least a threshold number of times, a minimum number of times, and/or a statistically significant number of times.

As used herein, "accelerator off" describes the condition in which no acceleration demand, request, and/or input is received from a driver (e.g., via an accelerator pedal and/or otherwise). "Accelerator off speed" means the speed of a vehicle at accelerator off. "Cruising speed" is a substantially constant speed of a vehicle after accelerating from a stop or a deceleration area.

As used herein, "acceleration learning" means the process of learning, recognizing, identifying, determining, detecting, and/or understanding a substantially consistent acceleration pattern that a vehicle repeatedly exhibits from substantially the same deceleration area. "Acceleration data" is any data acquired with respect to the acceleration of a vehicle from a stop or a deceleration area. Acceleration data can include raw data, formatted data, processed data, statistical information about acquired data, analyzed data, and/or information based on acquired data. "Acceleration record" means any acceleration data that is saved or stored. An acceleration record can be for a particular deceleration area or a particular stop.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some instances, the vehicle 100 can be a conventional vehicle. In other instances, the vehicle 100 can be a hybrid vehicle, such as a plug-in hybrid vehicle.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The various elements can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and or satellite-based wireless network, GSM, TDMA, CDMA, WCDMA networks or the like). The communication network can include wired communication links and/or wireless communication links. The communication network can include any combination of the above networks and/or other types of networks.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100.

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include measurements, dimensions, distances, and/or information for one or more items included in the map data 116 and/or relative to other items included in the map data 116. The map data 116 can include a digital map with information about road geometry. In one or more arrangement, the map data 116 can information about the ground, terrain, roads, surfaces, and/or other features of one or more geographic areas. The map data can include elevation data in the one or more geographic areas. The map data can define one or more ground surfaces, which can include paved roads, unpaved roads, land, and other things that define a ground surface. The map data 116 can be high quality and/or highly detailed.

In one or more arrangements, the one or more data stores 115 can include traffic rules data 117. The traffic rules data 117 can include one or more traffic rules. As used herein, "traffic rule" is any law, rule, ordinance or authority that governs the operation of a motor vehicle, including instances, situations, and/or scenarios in which a motor vehicle is required to stop or reduce speed. The traffic rules data 117 can include speed limit data. The traffic rules data 117 can be international, federal, national, state, city, township and/or local laws, rules, ordinances and/or authorities.

In one or more arrangements, the one or more data stores 115 can include vehicle deceleration data 118. The vehicle deceleration data 118 can include data acquired by the sensor system 120 of the vehicle 100. The vehicle deceleration data 118 can include deceleration data with respect to learned and/or unlearned deceleration area(s), deceleration data from learned and/or unlearned stop(s), learned deceleration areas, learned stops, deceleration profiles, brake pedal data, accelerator pedal data, location data, temporal data, distance data, and/or any data associated with the deceleration or stopping of the vehicle 100.

In one or more arrangements, the one or more data stores 115 can include vehicle acceleration data 119. The vehicle acceleration data 119 can include data acquired by the sensor system 120 of the vehicle 100. The vehicle acceleration data 119 can include acceleration data from learned and/or unlearned deceleration area(s), acceleration data from learned and/or unlearned stop(s), learned accelerations, acceleration profiles, accelerator pedal data, acceleration records, acceleration learning records, acceleration learning, brake pedal data, location data, temporal data, distance data, and/or any data associated with the acceleration of the vehicle 100, including any acceleration data and/or analysis of acceleration data described herein.

As noted above, the vehicle 100 can include the sensor system 120. The sensor system 120 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1).

The sensor system 120 can include any suitable type of sensor. For instance, the sensor system 120 can include one or more vehicle sensors 121, which can be configured to acquire, detect, determine, assess, monitor, measure, quantify and/or sense information about the vehicle 100 itself (e.g., position, orientation, speed, acceleration, deceleration, direction, accelerator pedal position, brake pedal position, pedal position, steering wheel position, etc.). In one or more arrangements, the one or more vehicle sensors 121 can include various inertial sensors such as gyroscopes and accelerometers, speedometers, vehicle wheel speed sensors, road condition sensors, suspension height sensors, steering angle sensors, steering torque sensors, brake pedal pressure sensors, accelerator pedal pressure sensors, pedal position sensors, and/or tire pressure sensors, just to name a few possibilities Alternatively or in addition, the sensor system 120 can include one or more environment sensors 122, which can be configured to acquire, detect, determine, assess, monitor, measure, quantify and/or sense data or information about the external environment in which a vehicle is located or one or more portions thereof. For example, such data or information can be related to obstacles in at least a portion of the external environment of the vehicle 100 and/or other things in the external environment of the vehicle 100, such as, for example, lane markers, signs, traffic lights, traffic signs, lane lines, crosswalks, curbs proximate the vehicle 100, off-road objects, etc. In one or more arrangements, the sensor system 120 can include one or more radar sensors, one or more LIDAR sensors, one or more sonar sensors, one or more cameras, and/or one or more ranging sensors.

The vehicle 100 can include an input system 130. An "input system" includes any device, component, system, element or arrangement or groups thereof that enable information/data to be entered into a machine. The input system 130 can be configured to receive an input from a vehicle occupant (e.g. a driver or a passenger). The vehicle 100 can include an output system 135. An "output system" includes any device, component, system, element or arrangement or groups thereof that enable information/data to be presented to a vehicle occupant (e.g. a person, a vehicle occupant, etc.). The output system 135 can be configured to present information/data to a vehicle occupant. Some components of the vehicle 100 may serve as both a component of the input system 130 and a component of the output system 135. In one or more arrangements, the output system 135 can include one or more displays, one or more projectors, and/or one or more speakers.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system, a braking system, a steering system, throttle system, a transmission system, a signaling system, and/or a navigation system. Each of these systems can include one or more mechanisms, devices, elements, components, systems, and/or combination thereof, now known or later developed.

The vehicle 100 can include a navigation system 150. The navigation system 150 can include one or more mechanisms, devices, elements, components, systems, applications and/or combinations thereof, now known or later developed, configured to determine the geographic location of the vehicle 100 and/or to determine a travel route for the vehicle 100.

The navigation system 150 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 150 can be configured to update the travel route dynamically while the vehicle 100 is in operation.

The navigation system 150 can include a global positioning system, a local positioning system or a geolocation system. The navigation system 150 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 150 can use Transmission Control Protocol (TCP) and/or a Geographic information system (GIS) and location services.

The navigation system 150 may include a transceiver configured to estimate a position of the vehicle 100 with respect to the Earth. For example, navigation system 150 can include a GPS transceiver to determine the vehicle's latitude, longitude and/or altitude. The navigation system 150 can use other systems (e.g. laser-based localization systems, inertial-aided GPS, and/or camera-based localization) to determine the location of the vehicle 100.

Alternatively or in addition, the navigation system 150 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The vehicle 100 can include one or more actuators to modify, adjust and/or alter one or more of the vehicle systems 140 or components thereof to responsive to receiving signals or other inputs from the processor(s) 110 and/or other element of the vehicle 100. The one or more actuators can include motors, pneumatic actuators, hydraulic pistons, relays, solenoids, and/or piezoelectric actuators, just to name a few possibilities. In one or more arrangements, the vehicle 100 can include one or more pedal actuators. The one or more pedal actuators can be associated with a brake pedal and/or an accelerator pedal of the vehicle 100. The one or more pedal actuators can be operatively connected to adjust the resistance level of the brake pedal and/or the accelerator pedal.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more deceleration modules 160. The deceleration module(s) 160 can be configured to perform various functions. As an example, the deceleration module(s) 160 can be configured to acquire and/or analyze data relating to decelerations of the vehicle 100, such data can include speed, acceleration/deceleration, pedal position, accelerator off, accelerator off speed, location, deceleration distance, etc. The deceleration module(s) 160 can receive and/or acquire data from the navigation system 150, the sensor system 120, the data store(s) 115, and/or any other source of information relating to the vehicle 100 and/or the external environment of the vehicle 100.

The deceleration module(s) 160 can be configured to learn deceleration areas encountered by the vehicle 100. For instance, after the vehicle 100 decelerates in the same or substantially the same area for a predetermined minimum number of times, a threshold number of times, and/or a statistically significant number of times, the deceleration module(s) 160 can be configured to learn that the area is a deceleration area. The predetermined minimum number of times, the threshold number of times, and/or the statistically significant number of times can be established by a vehicle manufacturer or some other entity. The deceleration module(s) 160 can be configured to learn the vehicle's deceleration profiles in such areas. The deceleration module(s) 160 can be configured to determine a target deceleration pattern from a current vehicle location to a target stop position in the deceleration area. The deceleration module(s) 160 can assist a vehicle driver in decelerating the vehicle on the basis of the deceleration pattern. For example, the deceleration module(s) 160 can be configured to coach a driver in efficiently coasting and/or braking to achieve the deceleration pattern. Examples of such functions are described in U.S. Pat. Nos. 8,862,342 and 9,202,378, both of which are incorporated herein by reference.

The vehicle 100 can include one or more acceleration modules 170. The acceleration module(s) 170 can be configured to perform various functions. As an example, the acceleration module(s) 170 can be configured to acquire or cause to be acquired data relating to accelerations of the vehicle 100, such data can include speed, acceleration/deceleration, pedal position, accelerator off, accelerator off speed, acceleration distance, cruising speed, location, etc. The acceleration module(s) 170 can receive and/or can acquire data from the navigation system 150, the sensor system 120, the data store(s) 115, and/or any other source of information relating to acceleration of the vehicle 100. The acceleration module(s) 170 can be configured to acquire and/or analyze data relating to accelerations of the vehicle 100.

Figure 2:
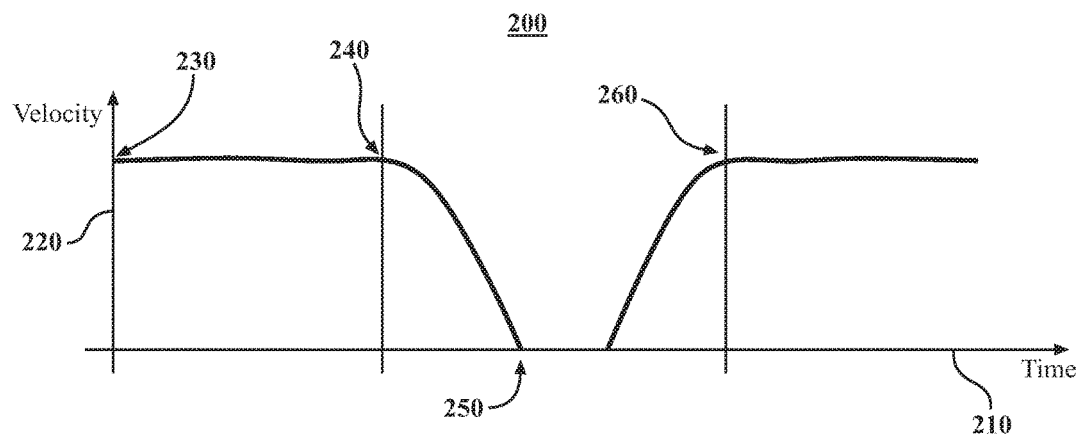
FIG. 2 is a graph of velocity versus time, showing an example of a vehicle coming to a stop at a learned stop and subsequently departing from the learned stop.
Figure 3:
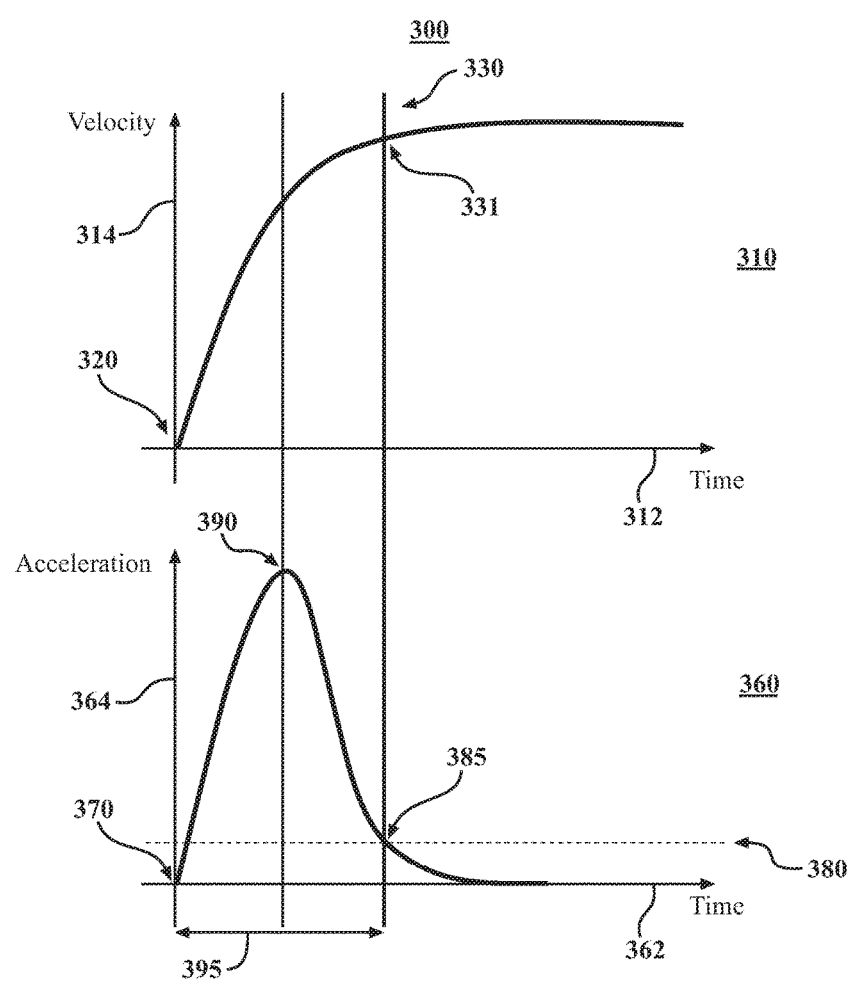
FIG. 3 is a combined graph relating to the departure of a vehicle from a learned stop, including a first graph of velocity versus time and a second graph of acceleration versus time, wherein the time axes of the first graph and the second graph are aligned.

FIGS. 2 and 3 will now be described to facilitate the description of some of the functions of the acceleration module(s) 170. FIG. 2 is a graph 200 showing the velocity of the vehicle 100 over time. More particularly, FIG. 2 shows an example of a scenario in which the vehicle 100 approaches a learned stop, comes to a stop at the learned stop, and subsequently accelerates from the learned stop. The graph 200 has an x-axis 210 of time and a y-axis 220 of velocity. At 230, the vehicle 100 is considered to be approaching a learned deceleration area. The vehicle 100 can be considered to be approaching the learned deceleration area in any suitable manner. As an example, the vehicle 100 can be considered to be approaching the learned deceleration area when it is located at or within a predetermined distance from a learned stop or deceleration area. At 240, the driver of the vehicle 100 discontinues providing an accelerator input (e.g., the driver takes his or her foot off of the accelerator pedal). Thus, reference no. 240 is the accelerator off point. At 250, the vehicle 100 comes to a stop at the learned stop. After a period of time, the vehicle 100 can accelerate from the learned stop. For instance, a traffic light may turn green, or it may otherwise be the vehicle's turn to proceed at a stop sign. The vehicle 100 can accelerate from the learned stop to a cruising speed 260 at which point the velocity of the vehicle 100 remains substantially constant for a period of time and/or acceleration of the vehicle 100 is substantially zero for a period of time.

FIG. 3 is a combined graph 300 showing performance characteristics of the vehicle 100 over time when the vehicle 100 departs from a learned stop. The combined graph 300 includes a first graph 310 and a second graph 360. The first graph 310 has an x-axis 312 of time and a y-axis 314 of velocity. The second graph 360 has an x-axis 362 of time and a y-axis 364 of acceleration. The x-axis 312 of the first graph 310 and the x-axis 362 of the second graph 360 are aligned such that any vertical line (e.g., a line parallel to the y-axis) that passes through both graphs represents the same moment in time.

In the first graph 310, reference no. 320 is the starting point of acceleration from the learned stop. Thus, at 320, the velocity of the vehicle 100 is zero. Reference no. 330 is the cruising speed of the vehicle 100.

In the second graph 360, reference no. 370 is the starting point of acceleration from the learned stop. Thus, at 370, the acceleration of the vehicle 100 is zero. Reference number 390 is the peak acceleration of the vehicle 100. Reference number 395 is the duration of the acceleration of the vehicle 100 from the starting point 370 to the cruising speed 330 of the vehicle 100.

The acceleration module(s) 170 can be configured to learn acceleration from a learned deceleration area. Each time the vehicle 100 encounters a learned deceleration area, acceleration data can be acquired as the vehicle 100 departs the learned deceleration area. The acquired acceleration data can include, for example, speed, acceleration, peak acceleration, acceleration duration, and/or cruising speed. The acceleration data can be acquired by one or more components of the vehicle 100, such as one or more sensors of the sensor system 120. The acceleration module(s) 170 can be configured to create an acceleration learning record for each encounter with a particular deceleration area. The acceleration learning record can be stored in the one or more data stores 115. If the vehicle 100 repeatedly exhibits a similar acceleration pattern from the same learned deceleration area, such as for a threshold number of times, a minimum number of times, and/or a statistically significant number of times, then acceleration from the learned deceleration area can become learned. The learned acceleration can be stored in the one or more data stores 115 (e.g., as part of the vehicle acceleration data 119). In some arrangements, once an acceleration becomes learned, new acceleration records are not created or are not stored when the vehicle 100 encounters the learned deceleration area in the future. Alternatively, acceleration records can continue to be created and/or stored after an acceleration from a deceleration area becomes learned.

In some arrangements, the acceleration module(s) 170 can be configured to store acceleration records only if the acceleration data is within a predetermined criteria of the previously stored acceleration records. If acceleration data for an acceleration is outside of the predetermined criteria of the previously stored acceleration records, such as due to unexpected or unusual road or traffic conditions, then the acceleration data can be discarded or filtered.

After an acceleration becomes learned, the acceleration module(s) 170 can be configured to predict acceleration of the vehicle 100 from the learned deceleration area. In one or more arrangements, the acceleration module(s) 170 can be configured to predict acceleration of the vehicle 100 if the deceleration area is a learned deceleration area and if the accelerator off speed measured during the vehicle's approach to the learned deceleration area speed meets a qualification rule based on the one or more prior accelerator off speeds for the learned deceleration area. For instance, the qualification rule can be one standard deviation of the one or more prior accelerator off speeds for the learned deceleration area. It will be appreciated that one standard deviation is merely an example and that any suitable qualification rule can be used. However, if the accelerator off speed measured during the vehicle's approach to the learned deceleration area speed does not meet a qualification rule based on the one or more prior accelerator off speeds for the learned deceleration area, then the acceleration module(s) 170 can be configured to not predict acceleration of the vehicle 100 from the learned deceleration area and/or so that the prediction is disabled, discarded, ignored, and/or filtered for this instance.

In instances in which the accelerator module(s) 170 make an acceleration prediction, the acceleration prediction and/or the determination of whether a prediction can be made (e.g., whether the acceleration is learned and/or whether the accelerator off speed meets a qualification rule, etc.) can be made at any suitable time. For instance, in one or more arrangements, the prediction can be made after the vehicle 100 comes to a stop at a learned stop or after the vehicle 100 is substantially at a target deceleration speed.

The prediction of acceleration can include, starting from a current vehicle location and speed (e.g., zero or a reduced speed at a learned deceleration area), a predicted cruising speed. In one or more arrangements, the cruising speed can be predicted to be substantially equal to the accelerator off speed for the learned deceleration area for this particular encounter with the learned deceleration area. The acceleration prediction can also include a duration of the acceleration. In one or more arrangements, the duration of the acceleration can be predicted to be substantially equal to the duration of accelerator off to coming to a stop or a reduced speed for the learned deceleration area. The acceleration prediction can also include an estimate of the required acceleration energy to perform the predicted acceleration.

In some arrangements, the cruising speed can be predicted in a different manner. Using the prior acceleration records from the learned deceleration area, the acceleration module(s) 170 can determine a point 385 at which the acceleration of the vehicle 100 falls below a predetermined threshold 380 following peak acceleration 390 (FIG. 3). A vehicle speed 331 corresponding to the point 385 can be determined. The difference (absolute or percentage) between the vehicle speed 331 and the accelerator off speed and/or the measure cruising speed can be determined. Such information can be included in the acceleration records. In one or more arrangements, after acceleration becomes learned for a deceleration area, the cruising speed can be predicted to be a speed based on the vehicle speed 331 for the prior acceleration records (e.g., average, median, mean, etc.).

In one or more arrangements, a correction factor can be determined based on the difference (absolute or relative) between the vehicle speed 331 and the accelerator off speed and/or the measured cruising speed for the prior acceleration records. For instance, the correction factor can be an average, median, or mean of the differenced (absolute or relative) between the vehicle speed 331 and the accelerator off speed and/or the measure cruising speed for the prior acceleration records. Thus, the acceleration can be predicted to be the accelerator off speed modified or adjusted by the correction factor.

The acceleration module(s) 170 can be configured to use a predicted acceleration in any suitable manner. For example, the acceleration module(s) 170 can be configured to cause one or more vehicle controls to be implemented to support an acceleration based on a predicted acceleration.

The acceleration module(s) 170 can cause, directly or indirectly, such vehicle controls to be implemented. As used herein, "cause" or "causing" means to make, force, compel, direct, command, instruct, and/or enable an event or action to occur or at least be in a state where such event or action may occur, either in a direct or indirect manner. The acceleration module(s) 170 can execute various vehicle functions and/or to transmit data to, receive data from, interact with, and/or control the vehicle 100 or one or more systems thereof (e.g. one or more of vehicle systems 140).

There are various example controls that can be implemented by the vehicle 100. For instance, in a hybrid gasoline-electric vehicle, if a relatively small acceleration is predicted, then the acceleration module(s) 170 can be configured to implement vehicle controls to prevent the engine being used so that the vehicle 100 uses electrical energy to achieve the acceleration. As another example, the acceleration module(s) 170 can be configured to implement vehicle controls to ramp up the engine without actually firing the engine. As a further example, if the vehicle is a conventional vehicle, the acceleration module(s) 170 can be configured to adjust transmission gear selections. For instance, the transmission of the vehicle 100 can be set to second gear as the vehicle 100 departs from the learned deceleration area.

As a still further example, based on the acceleration prediction (duration and energy), the acceleration module(s) 170 can be configured to determine an efficiency engine operating point. Further, the acceleration module(s) 170 can be configured to determine a pre-charge state of charge (SOC) needed to enable the predicted acceleration. The acceleration module(s) 170 can be configured to determine an amount of time to pre-charge the vehicle battery to the pre-charge SOC before the actual acceleration begins. The acceleration module(s) can be configured to cause the vehicle 100 to preemptively pre-charge the battery before the predicted acceleration occurs. Thus, when an acceleration request is received from the driver, the vehicle is ready to support the acceleration at a constant engine operating power.

Figure 4:
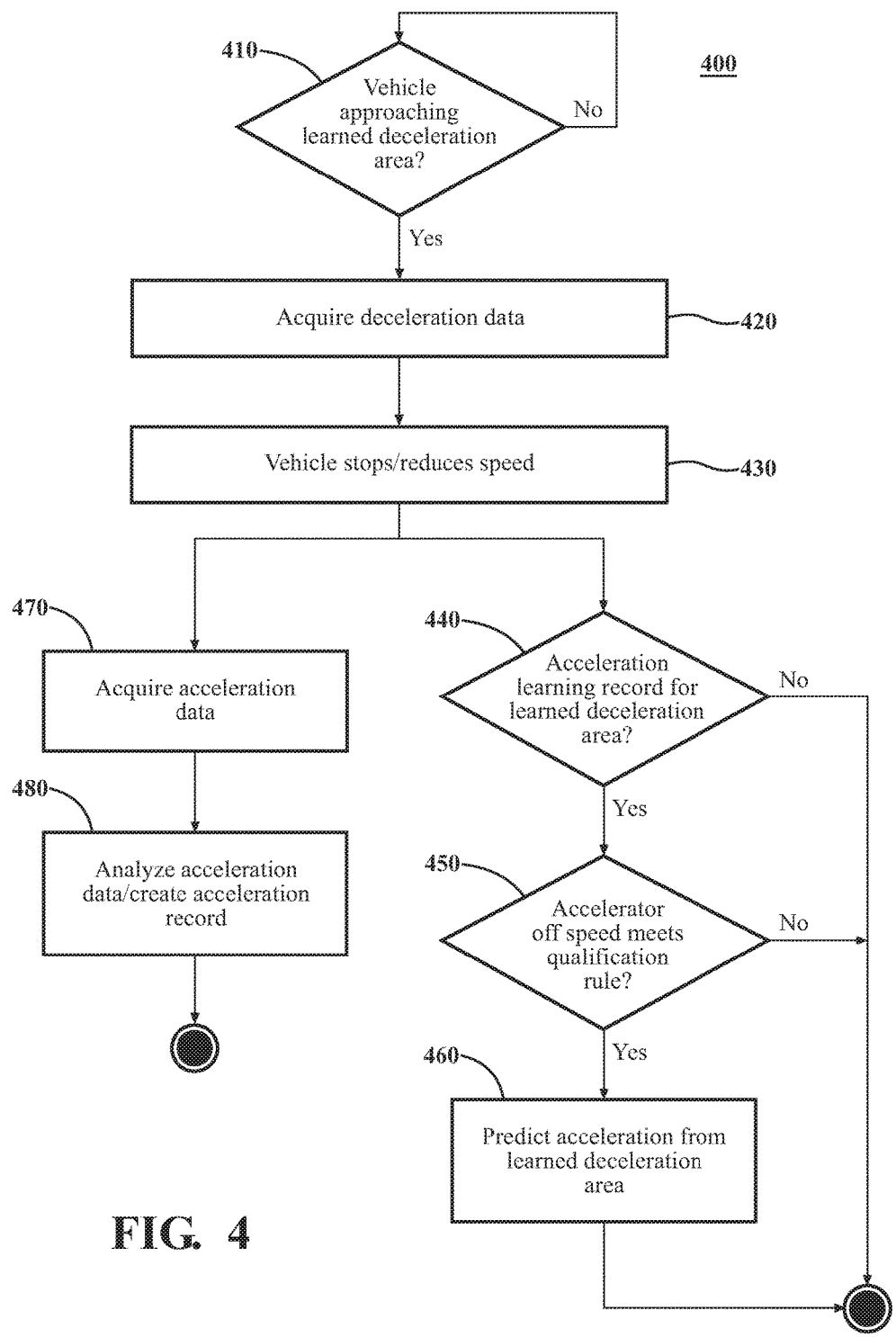
FIG. 4 is an example of a method of acceleration learning and/or acceleration prediction from a learned stop.

Now that the various potential systems, devices, elements and/or components of the vehicle 100 have been described, various methods of operating the vehicle will now be described. Referring now to FIG. 4, an example of a method 400 is shown. Various possible steps of such methods will now be described. The method 400 illustrated in FIG. 4 may be applicable to the arrangements described above in relation to FIGS. 1-3, but it is understood that the method 400 can be carried out with other suitable systems and arrangements. Moreover, the method 400 may include other steps that are not shown here, and in fact, the method 400 is not limited to including every step shown. The blocks that are illustrated here as part of the method 400 are not limited to the particular chronological order. Indeed, some of the blocks may be performed in a different order than what is shown and/or at least some of the blocks shown can occur simultaneously.

At block 410, it can be determined whether the vehicle 100 is approaching a learned deceleration area. Such a determination can be made in any suitable manner. For instance, the vehicle 100 can be determined to be approaching a learned deceleration area when it is located at or within predetermined distance from the learned deceleration area. The predetermined distance can have any suitable value. The determining of whether the vehicle 100 is approaching a learned deceleration area can be performed by any suitable element or combination of elements of the vehicle 100. For example, in one or more arrangements, the determining can be performed by the deceleration module(s) 160, the acceleration module(s) 170, the navigation system 150, and/or the processor(s) 110. A travel plan of the vehicle 100 can be analyzed to identify learned deceleration areas along the travel path. Using real-time location data, the vehicle 100 can determine its current location relative to a learned deceleration area.

If it is determined that the vehicle 100 is not approaching a learned deceleration area, then the method 400 can end, return to block 410, or continue to some other block. If it is determined that the vehicle 100 is approaching a learned deceleration area, then the method 400 can continue to block 420.

At block 420, deceleration data of the vehicle 100 as it approaches the learned deceleration area can be acquired. The acquired deceleration data can include accelerator pedal position, accelerator off, brake pedal position, vehicle location, and/or vehicle speed. The acquired acceleration data can include accelerator off vehicle speed and/or accelerator off vehicle position. The deceleration data can be acquired by one or more sensors of the sensor system 120. The acquired deceleration data can be stored in the one or more data store(s) 115. The method 400 can continue to block 430.

At block 430, the vehicle 100 can come to a stop or a reduced speed. The vehicle 100 can determine the speed of the vehicle using one or more sensors of the sensor system 120. The method can continue to decision block 440 and/or block 470.

At decision block 440, it can be determined whether there is an acceleration learning record for the learned deceleration area. The acceleration learning record can include one or more prior accelerator off speeds for the learned deceleration area. The determining of whether there is an acceleration learning record for the learned deceleration area can be performed by any suitable element or combination of elements of the vehicle 100. For example, in one or more arrangements, the determining can be performed by the acceleration module(s) 170 and/or the processor(s) 110. For example, the acceleration module(s) 170 and/or the processor(s) 110 can query the data store(s) 115 for acceleration learning records for the learned deceleration area.

In response to determining that there is not an acceleration record for the learned deceleration area, then the method 400 can end, return to block 410, or continue to some other block. In response to determining that there is an acceleration learning record for the learned deceleration area, the method can continue to block 450.

At block 450, it can be determined whether the current accelerator off speed meets a qualification rule based on the one or more prior accelerator off speeds for the learned deceleration area. Any suitable qualification rule can be used. In one or more arrangements, the qualification rule can be whether the current accelerator off speed is within one standard deviation of the one or more prior accelerator off speeds for the learned deceleration area. If the current accelerator off speed is within one standard deviation of the one or more prior accelerator off speeds for the learned deceleration area, then the qualification rule can be determined to have been met. If the current accelerator off speed is not within one standard deviation of the one or more prior accelerator off speeds for the learned deceleration area, then the qualification rule can be determined to have been not met.

In response to determining that the current accelerator off speed does not meet the qualification rule based on the one or more prior accelerator off speeds for the learned deceleration area, the method 400 can end, return to block 410, or continue to some other block. In response to determining that the current accelerator off speed meets the qualification rule based on the one or more prior accelerator off speeds for the learned deceleration area, the method 400 can continue to block 460.

At block 460, an acceleration of the vehicle from the learned deceleration area can be predicted. The predicted acceleration can be from a starting speed at the learned deceleration area (e.g., starting speed is zero from a stop) to a cruising speed. The cruising speed can be predicted to be substantially equal to the current accelerator off speed. The predicted acceleration can include a predicted acceleration duration. The method 400 can end, return to block 410, or continue to some other block. As an example, in one or more arrangements, the vehicle 100 can be caused to implement one or more vehicle controls based on the predicted acceleration of the vehicle from the learned deceleration area. The vehicle 100 can be caused to implement the vehicle controls in any suitable manner. In one or more arrangements, the processor(s) 110 and/or the acceleration module(s) 170 can cause the vehicle 100 to implement the vehicle controls. The processor(s) 110 and/or the acceleration module(s) 170 can be operatively connected to one or more of the vehicle systems 140 to implement the vehicle controls. In one or more arrangements, the processor(s) 110 and/or the acceleration module(s) 170 can be operable to control one or more actuators, which can control, adjust, or change one or more of the vehicle systems 140 or portions thereof to implement the one or more vehicle controls.

It should be noted that causing the one or more vehicle controls to be implemented can be performed automatically. In one or more arrangements, a vehicle occupant (e.g. a driver and/or other passenger) can be prompted to provide permission to implement the one or more vehicle controls. The vehicle occupant can be prompted in any suitable manner (e.g., visual, audible, and/or haptic, etc.). Responsive to receiving an input corresponding to a vehicle occupant's approval to implement the one or more vehicle controls, the vehicle 100 can be caused to implement the one or more vehicle controls.

As noted above, the vehicle 100 can, alternatively or in addition, learn the vehicle behavior during acceleration from the learned stop. In one or more arrangements, the method 400 can continue from block 430 to block 470. At block 470, acceleration data of the vehicle 100 can be acquired as it accelerates from the learned deceleration area. The acquired acceleration data can include accelerator pedal position, accelerator off, brake pedal position, vehicle location, time, speed, minimum speed, maximum speed, acceleration, peak acceleration, cruising speed, minimum cruising speed, maximum cruising speed, and/or acceleration duration, just to name a few possibilities. The acceleration data can be acquired by one or more sensors of the sensor system 120. The method 400 can continue to block 480.

At block 480, the acquired acceleration data can be analyzed and/or an acceleration record can be created based on the acquired acceleration data. The acquired acceleration data can be analyzed in any suitable manner. In one or more arrangements, the measured cruising speed for the acceleration can be compared to the accelerator off speed. Such a comparison can be useful to determine whether the measured cruising speed is substantially equal to the accelerator off speed. If the measured cruising speed is not substantially equal to the accelerator off speed, then the difference can be noted and such information can be used in predicting acceleration from the learned deceleration area once the acceleration becomes learned.

An acceleration record based on the acquired acceleration data can be created by the acceleration module(s) 170 and/or the processor(s) 110. The acceleration record can include the raw acceleration data acquired at block 470 and/or analyzed and/or modified acceleration data. The acceleration record can be stored in the one or more data store(s) 115. Once a sufficient number of acceleration records are created for the learned deceleration area (e.g., a predefined minimum number of acceleration records, a statistically significant number of acceleration records, etc.), acceleration for the learned deceleration area can become learned.

It should be noted that blocks 470 and 480 can be performed at any time relative to blocks 440, 450, and 460. For instance, blocks 470 and 480 can be performed in parallel to blocks 440, 450, and 460.

It will be appreciated that arrangements described herein can provide numerous benefits, including one or more of the benefits mentioned herein. For example, arrangements described herein can result in improvements in fuel economy, vehicle response, and/or vehicle safety management.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of acceleration learning or prediction for a vehicle at learned deceleration areas, the method comprising:
while approaching a learned deceleration area, acquiring, using one or more sensors, deceleration data for the vehicle, the deceleration data including a current accelerator off speed;
determining whether there is an acceleration learning record for the learned deceleration area, the acceleration learning record including one or more prior accelerator off speeds for the learned deceleration area;

responsive to determining that there is an acceleration learning record for the learned deceleration area, determining whether the current accelerator off speed meets a qualification rule based on the one or more prior accelerator off speeds for the learned deceleration area;

responsive to determining that the current accelerator off speed meets the qualification rule based on the one or more prior accelerator off speeds for the learned deceleration area, predicting an acceleration of the vehicle from the learned deceleration area, the acceleration being from a starting speed at the learned deceleration area to a cruising speed, the cruising speed being substantially equal to the current accelerator off speed; and causing the vehicle to implement one or more vehicle controls based on the predicted acceleration of the vehicle from the learned deceleration area.

2. The method of claim 1, further including:
responsive to determining that the current accelerator off speed does not meet the qualification rule based on the one or more prior accelerator off speeds for the learned deceleration area, disabling prediction of an acceleration of the vehicle from the learned deceleration area.

3. The method of claim 1, further including:
responsive to determining that there is no acceleration learning record for the learned deceleration area, disabling prediction of an acceleration of the vehicle from the learned deceleration area.

4. The method of claim 3, further including:
acquiring, using one or more sensors, acceleration data for the vehicle from the learned deceleration area; and
storing the acquired acceleration data, whereby an acceleration record is saved for the learned deceleration area.

5. The method of claim 1, wherein determining whether the current accelerator off speed meets a qualification rule based on the one or more prior accelerator off speeds for the learned deceleration area includes determining whether the current accelerator off speed is within one standard deviation of the one or more prior accelerator off speeds for the learned deceleration area.

6. The method of claim 1, further including:
acquiring, using one or more sensors, acceleration data for the vehicle from the learned deceleration area, the acceleration data including a cruising speed.

7. The method of claim 1, wherein predicting the acceleration of the vehicle from the learned deceleration area includes predicting a duration of the acceleration.

8. The method of claim 1, wherein the learned deceleration area is a learned stop.

9. A system of acceleration learning or prediction for a vehicle at learned deceleration areas, the system comprising:
one or more sensors, the one or more sensors being configured to acquire deceleration data for the vehicle while approaching a learned deceleration area, the deceleration data including a current accelerator off speed; and
one or more processors operatively connected to the one or more sensors, the one or more processors being programmed to initiate executable operations comprising:
determine whether there is an acceleration learning record for the learned deceleration area, the acceleration learning record including one or more prior accelerator off speeds for the learned deceleration area;
responsive to determining that there is an acceleration learning record for the learned deceleration area, determine whether the current accelerator off speed meets a qualification rule based on the one or more prior accelerator off speeds for the learned deceleration area;

responsive to determining that the current accelerator off speed meets the qualification rule based on the one or more prior accelerator off speeds for the learned deceleration area, predict an acceleration of the vehicle from the learned deceleration area, the acceleration being from a starting speed at the learned deceleration area to a cruising speed, the cruising speed being substantially equal to the current accelerator off speed; and causing the vehicle to implement one or more vehicle controls based on the predicted acceleration of the vehicle from the learned deceleration area.

10. The system of claim 9, wherein the executable operations further include:
responsive to determining that the current accelerator off speed does not meet the qualification rule based on the one or more prior accelerator off speeds for the learned deceleration area, disabling prediction of an acceleration of the vehicle from the learned deceleration area.

11. The system of claim 9, wherein the executable operations further include:
responsive to determining that there is no acceleration learning record for the learned deceleration area, disabling prediction of an acceleration of the vehicle from the learned deceleration area.

12. The system of claim 11, wherein the one or more sensors are further configured to acquire acceleration data for the vehicle from the learned deceleration area, and wherein the executable operations further include storing the acquired acceleration data, whereby an acceleration record is saved for the learned deceleration area.

13. The system of claim 9, wherein determining whether the current accelerator off speed meets a qualification rule based on the one or more prior accelerator off speeds for the learned deceleration area includes determining whether the current accelerator off speed is within one standard deviation of the one or more prior accelerator off speeds for the learned deceleration area.

14. The system of claim 9, wherein the one or more sensors are further configured to acquire acceleration data for the vehicle from the learned deceleration area, the acceleration data including a cruising speed.

15. The system of claim 9, wherein predicting the acceleration of the vehicle from the learned deceleration area includes predicting a duration of the acceleration.

16. The system of claim 9, wherein the learned deceleration area is a learned stop.

17. A computer program product for a vehicle, the vehicle being configured to learn or predict acceleration for a vehicle at learned deceleration areas, the computer program product comprising a computer readable storage medium having program code embodied therein, the program code executable by a processor to perform a method comprising:
determining whether there is an acceleration learning record for a learned deceleration area, the acceleration learning record including one or more prior accelerator off speeds for the learned deceleration area;
responsive to determining that there is an acceleration learning record for the learned deceleration area, determining whether an acquired accelerator off speed for the learned deceleration area meets a qualification rule based on the one or more prior accelerator off speeds for the learned deceleration area;

responsive to determining that the acquired accelerator off speed for the learned deceleration area meets the qualification rule based on the one or more prior accelerator off speeds for the learned deceleration area, predicting an acceleration of the vehicle from the learned deceleration area, the acceleration being from a starting speed at the learned deceleration area to a cruising speed, the cruising speed being substantially equal to the acquired accelerator off speed; and causing the vehicle to implement one or more vehicle controls based on the predicted acceleration of the vehicle from the learned deceleration area.

18. The computer program product of claim 17, the method further including:

responsive to determining that the acquired accelerator off speed does not meet the qualification rule based on the one or more prior accelerator off speeds for the learned deceleration area, disabling prediction of an acceleration of the vehicle from the learned deceleration area.

\* \* \* \* \*